United States Patent
Remillard et al.

(10) Patent No.: US 7,079,974 B2
(45) Date of Patent: Jul. 18, 2006

(54) SYSTEM AND METHOD FOR DETECTING AN OBJECT USING PULSED LIGHT

(75) Inventors: Jeffrey Thomas Remillard, Ypsilanti, MI (US); Willes H. Weber, Ann Arbor, MI (US); Allan J. Lippa, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 10/065,576

(22) Filed: Oct. 31, 2002

(65) Prior Publication Data

US 2003/0036881 A1     Feb. 20, 2003

Related U.S. Application Data

(63) Continuation-in-part of application No. 09/598,284, filed on Jun. 22, 2000, now Pat. No. 6,429,429.

(51) Int. Cl.
    *G06F 15/50* (2006.01)

(52) U.S. Cl. .................. 702/159; 702/158; 180/169

(58) Field of Classification Search ............... 702/158, 702/159; 340/901–904, 933, 934, 942, 555; 356/3.01, 3.04, 4.01, 4.02, 5.01, 5.03, 5.05, 356/5.08; 180/167, 168, 169; 396/104, 396/106, 120, 123, 125

See application file for complete search history.

(56) References Cited

U.S. PATENT DOCUMENTS

| | | | | |
|---|---|---|---|---|
| 3,765,768 A | * | 10/1973 | Budin et al. ................. 356/28 |
| 4,477,184 A | * | 10/1984 | Endo ....................... 356/141.1 |
| 4,552,456 A | * | 11/1985 | Endo ......................... 356/5.06 |
| 4,598,198 A | * | 7/1986 | Fayfield ...................... 250/205 |
| 4,864,220 A | * | 9/1989 | Aoshima et al. .............. 324/96 |
| 4,926,170 A | * | 5/1990 | Beggs et al. ................. 340/904 |
| 4,973,834 A | * | 11/1990 | Kim ............................ 250/221 |
| 5,034,683 A | * | 7/1991 | Takahashi et al. ........... 324/753 |
| 5,354,983 A | * | 10/1994 | Juds et al. ................ 250/222.1 |
| 5,388,048 A | * | 2/1995 | Yavnayi et al. ............. 701/301 |
| 5,485,155 A | * | 1/1996 | Hibino ......................... 342/70 |
| 5,504,570 A | * | 4/1996 | Akasu ......................... 356/5.05 |
| 5,539,199 A | * | 7/1996 | Ruckh et al. ............. 250/222.1 |
| 5,565,870 A | * | 10/1996 | Fukuhara et al. .............. 342/70 |
| 5,633,706 A | * | 5/1997 | Cho et al. ................... 356/5.01 |
| 5,637,040 A | * | 6/1997 | Kim et al. ................... 454/256 |
| 5,669,174 A | | 9/1997 | Teetzel |
| 5,923,427 A | * | 7/1999 | Dong .......................... 356/623 |
| 5,949,530 A | | 9/1999 | Wetteborn |
| 5,953,110 A | * | 9/1999 | Burns ........................ 356/5.01 |
| 6,144,366 A | * | 11/2000 | Numazaki et al. .......... 345/156 |
| 6,157,024 A | * | 12/2000 | Chapdelaine et al. ....... 250/221 |
| 6,201,236 B1 | * | 3/2001 | Juds ............................ 250/221 |

(Continued)

FOREIGN PATENT DOCUMENTS

JP    05297141 A   * 11/1993

*Primary Examiner*—Carol S. W. Tsai
(74) *Attorney, Agent, or Firm*—Allan J. Lippa; Bir Law, PLC; David S. Bir (57) ABSTRACT

A system and method for detecting an object is provided. The method includes emitting a light pulse. The method further includes receiving a reflection of the light pulse. The method further includes indicating a presence of the object from the received light pulse. Finally, the method includes adjusting sensitivity of the indicating step based on an elapsed time from the emission.

18 Claims, 6 Drawing Sheets

U.S. PATENT DOCUMENTS

| | | |
|---|---|---|
| 6,279,687 B1 | 8/2001 | Pustelniak et al. |
| 6,323,940 B1 * | 11/2001 | Yoshida ...................... 356/3.04 |
| 6,415,241 B1 * | 7/2002 | Yoshida ....................... 702/159 |
| 6,422,713 B1 | 7/2002 | Fohl et al. |
| 6,611,610 B1 * | 8/2003 | Stam et al. .................. 382/104 |
| 2003/0222772 A1 * | 12/2003 | Laufer ........................ 340/435 |
| 2003/0230705 A1 * | 12/2003 | Stephan et al. ........ 250/214 VT |

* cited by examiner

SYSTEM AND METHOD FOR DETECTING AN OBJECT USING PULSED LIGHT

CROSS REFERENCE TO RELATED APPLICATIONS

This application is a Continuation-In-Part of U.S. patent application Ser. No. 09/598,284 entitled NIGHT VISION SYSTEM UTILIZING A DIODE LASER ILLUMINATION MODULE AND A METHOD RELATED THERETO filed Jun. 22, 2000 now U.S. Pat. No. 6,429,429.

BACKGROUND OF INVENTION

1. Field of the Invention

This invention relates to a system and method for detecting an object using pulsed light.

2. Background of the Invention

A known system for detecting objects in a region adjacent an elevator doorway is disclosed in U.S. Pat. No. 6,279,687. The system utilizes a plurality of diodes that emit light into the region and a plurality of photodiodes that receives the light reflected from an object in the region and generates signals responsive thereto. The signals are sampled a predetermined number of times. If the lowest value sampled signal reaches a predetermined constant threshold, an object detection signal is generated.

The known system, however, has several drawbacks that would make its use in automotive vehicles disadvantageous. For example, in foggy road conditions, a large portion of transmitted light from a light transmitter would be reflected back toward a light detector proximate the transmitter. The amplitude of the signal generated by the light detector would be relatively high and could be greater than a constant threshold. value (used for detecting objects at large distances from the vehicle). Thus, when the signal is greater than the constant threshold value due to fog, the known system would inadvertently indicate a solid object was detected.

Still further, if the constant threshold value for detecting objects were set to a relatively large value—to avoid false object detections due to fog—the known system would be unable to detect large objects at relatively large distances in front of a vehicle. In particular, these objects would have a low intensity return light pulse resulting in a relatively small signal amplitude. Thus, when the signal amplitude is less than the relatively large constant threshold value, no detection of the object would occur.

Thus, because the known system does not vary its detection sensitivity based on a distance (or elapsed travel time) of the light pulse, the system would be unable to detect objects at relatively large distances. Further, the known system would also falsely indicate detection of an object in fog conditions.

The inventors herein have recognized that there is thus a need for a system that can vary its detection sensitivity to detect objects at relatively large distances and to detect objects in fog conditions.

SUMMARY OF INVENTION

The present invention provides a system and a method for detecting an object disposed in an environment.

A method for detecting an object in accordance with a first aspect of the present invention is provided. The method includes emitting a light pulse. The method further includes receiving a reflection of the light pulse. The method further includes indicating a presence of the object from the received light pulse. Finally, the method includes adjusting sensitivity of the indicating step based on an elapsed time from the emission.

A method for detecting an object in accordance with a second aspect of the present invention is provided. The method includes emitting a plurality of light pulses. The method further includes receiving a reflection of the light pulses. The method further includes indicating a presence of the object from the received light pulses. Finally, the method includes adjusting sensitivity of the indicating step based on a travel time of the pulses.

A system for detecting an object in accordance with a third aspect of the present invention is provided. The system includes a light source generating a light pulse that is emitted. The method further includes a light detector configured to receive a reflection of the pulse. Finally, the method includes a controller operably connected to the light source and the detector. The controller is configured to indicate a presence of the object from the received light pulse. The controller is further configured to adjust sensitivity for detecting the object based on an elapsed time from the emission.

The system and methods for detecting an object represent a significant improvement over conventional systems and methods. In particular, the system varies its detection sensitivity based on elapsed travel time of the light pulse to detect objects at relatively large distances. Further, by varying the detection sensitivity, the known system can detect objects through fog.

DETAILED DESCRIPTION

Figure 1:
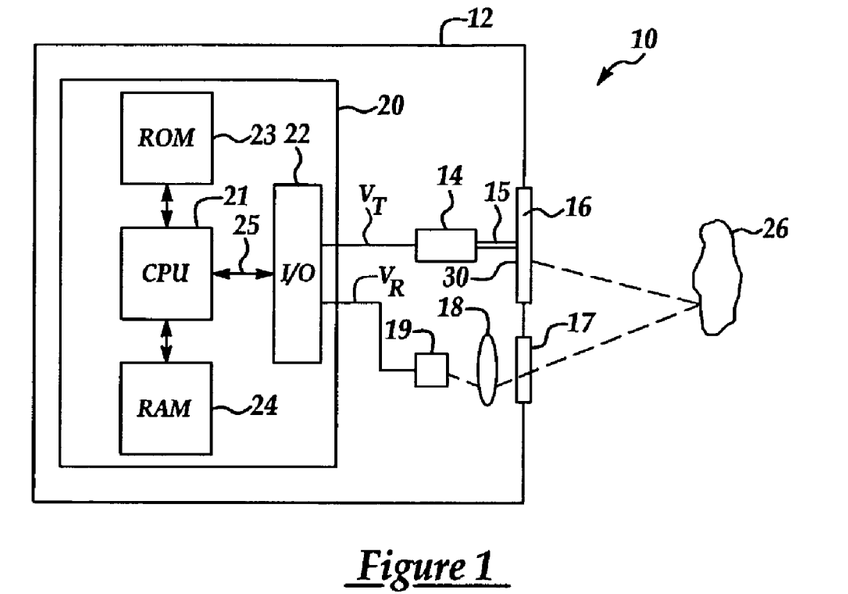
FIG. 1 is a schematic of a system for detecting an object in accordance with a third aspect of the present invention.

Referring now to the drawings wherein like reference numerals are used to identify identical components in the various views, FIG. 1 illustrates a system 10 for detecting an object. The system 10 may be utilized in a plurality of applications where detection of objects is desired. For example, system 10 may be used in an automotive vehicle (not shown) to detect objects on a roadway at relatively large distances from the vehicle.

As illustrated, system 10 includes a housing 12 which can hold the remaining components of system 10. It should be understood, however, that the components of system 10 contained in housing 12 could be disposed at different locations wherein housing 12 would not be needed. For example, the components of system 10 could be disposed at different operative locations in the automotive vehicle so that a single housing 12 would be unnecessary.

The system 10 further includes a light source 14, a fiber optic cable 15, a polymeric light reflector 16, a narrow-band optical filter 17, a focusing lens 18, a light detector 19, and a controller 20.

Light source 14 is provided to generate one or more light pulses to illuminate the environment and objects in the environment. The light pulses can either be in the visible light spectrum or the non-visible light spectrum. For purposes of discussion below, the light pulse may comprise a near infrared (NIR) light pulse, whose wavelength is in the 700–1500 nm range. Further, light source 14 may comprise a NIR diode laser. In alternate embodiments, light source 14 could comprise other devices capable of emitting relatively short duration light pulses having a pulse duration of 10–100 ns for example.

As illustrated, light source 14 receives one or more voltage pulses ($V_T$) from controller 20 and generates NIR light pulses responsive thereto. In particular, light source 14 may comprise a Single Stripe Diode Laser, Model No. S-81-3000-C-200-H manufactured by Coherent, Inc. of Santa Clara, Calif. As illustrated, light source 14 may be disposed in housing 12. Further, light source 14 may be connected to a first end of the fiber optic cable 15 using a conventional light coupler (not shown) as known by those skilled in the art. The second end of fiber optic cable 15 is operatively disposed adjacent to polymeric light reflector 16.

Fiber optic cable 15 is utilized to transmit light from light source 14 to light reflector 16. Because of the high brightness (candela per unit area) of light source 14, cable 15 preferably is a relatively small diameter (0.1–1.0 mm) glass fiber. The use of a small diameter glass fiber provides several benefits over monofilament plastic pipes and glass fiber bundles used in non-laser based remote lighting systems. A small diameter glass fiber is less bulky than plastic pipes or glass fiber bundles that typically are 10–12 mm in diameter. Further, a small diameter glass fiber is significantly less expensive than monofilament plastic pipes or glass fiber bundles.

Still further, a small diameter glass fiber is easier to package, handle, and to install than monofilament plastic pipes or glass fiber bundles.

Figure 2:
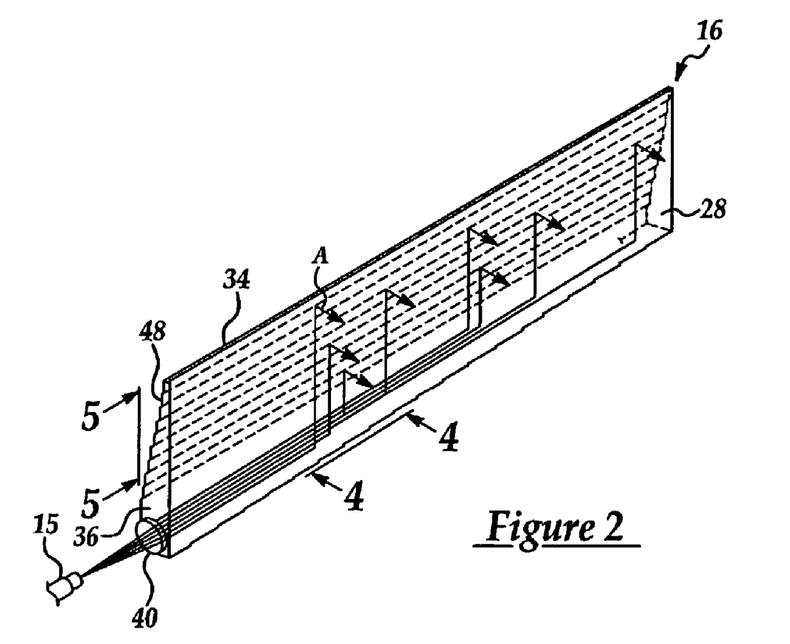
FIG. 2 is a perspective view of a polymeric light reflector utilized in the system of FIG. 1.
Figure 3:
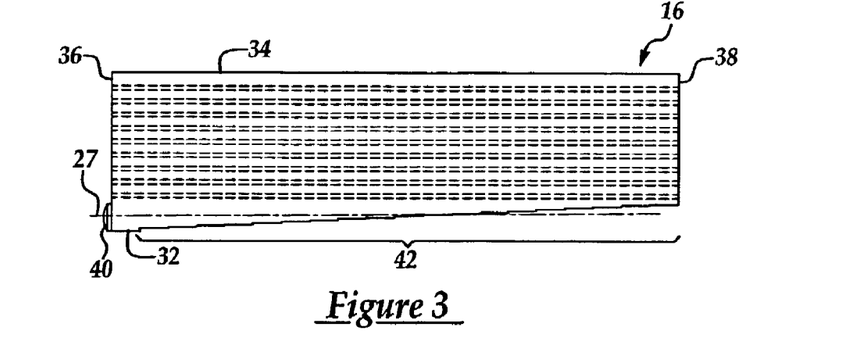
FIG. 3 is a front view of the polymeric light reflector of FIG. 2.

Referring to FIG. 2, polymeric light reflector 16 is provided to reflect and expand light (represented by arrows A) generated by light source 14 generally in a first direction from reflector 16. In a preferred embodiment, shown in FIGS. 2 and 3, reflector 16 comprises a unitary sheet of optical material extending generally along a first axis 27. Reflector 16 preferably has a thickness range from 3–9 mm. It should be understood, however, that reflector 16 may have a thickness less than 3 mm or greater than 9 mm. Reflector 16 is preferably constructed from a transparent, solid piece of plastic such as polycarbonate and utilizes the principle of total internal reflection (TIR) to reflect light. TIR is explained in more detail hereinbelow. Reflector 16 may also be constructed from other polymeric transparent materials such as acrylics. Referring to FIGS. 1, 2 and 3, reflector 16 includes a front surface 28, a back surface 30, a bottom surface 32, a top surface 34, side surfaces 36, 38, and an aspheric lens 40.

Figures 4, 5:
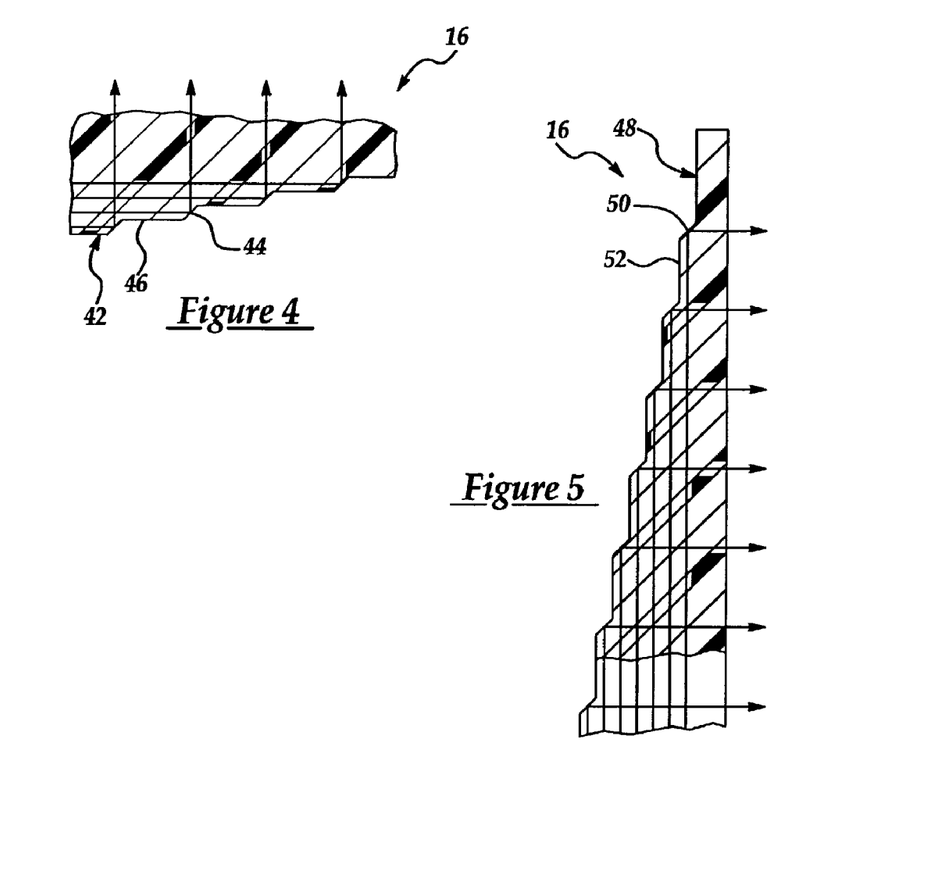
FIG. 4 is an enlarged fragmentary sectional view of the polymeric light reflector of FIG. 2 taken along lines 4—4.
FIG. 5 is an enlarged fragmentary sectional view of the polymeric light reflector of FIG. 2 taken along lines 5—5.

Referring to FIGS. 3 and 4, bottom surface 32 of reflector 16 defines a first plurality of reflective steps 42 extending generally along the axial length of reflector 16. Each of reflective steps 42 includes a reflective facet 44 and a tread portion 46. As illustrated, each tread portion 46 is generally parallel to the axis 27. Each reflective facet 44 is oriented at approximately a 45° angle relative to the adjacent tread portion 46. It should be understood, however, that the angle of each reflective facet 44 may vary depending upon the critical angle (discussed further hereinbelow) of the respective facet 44. Further, reflective facet 44 may have a curved shape (not shown) to further direct the light in a desired direction. Still further, the number of reflective steps 42 may vary, and correspondingly, the number of reflective facets 44 may vary.

Reflective facets 44 utilize the principle of TIR to reflect light received from aspheric lens 40 towards reflective facets 50. Total internal reflection of the light occurs when the incident angle θ exceeds the critical angle $θ_c$ given by the equation $θ_c = \sin^{-1}(n_1/n_2)$ wherein $n_1$ is the index of refraction of air and $n_2$ is the index of refraction of the polymeric material used to construct reflector 16. In an alternate embodiment (not shown), reflective facets 44 can be metalized if the light strikes facets 44 at an angle less than the critical angle.

Referring to FIGS. 1, 2 and 5, back surface 30 defines a second plurality of reflective steps 48 extending generally perpendicular to axis 27. Each of reflective steps 48 includes a reflective facet 50 and a tread portion 52. As illustrated, each tread portion 52 is generally perpendicular to axis 27 and parallel to front surface 28. Each reflective facet 50 is oriented at approximately a 45° angle relative to the adjacent tread portion 52. It should be understood, however, that the angle of each reflective facet 50 may vary depending upon the critical angle of the respective facet 50. Further, each reflective facet 50 may have a curved shape (not shown) to further direct the light in a desired direction. Still further, the number of reflective steps 48 may vary, and correspondingly, the number of reflective facets 50 may vary. Referring to FIGS. 4 and 5, facets 50 are aligned to receive light reflected from one or more reflective facets 44, and, like facets 44, utilize the principle of TIR. Facets 50 reflect the received light through front surface 28 of reflector 16 as will be described in further detail hereinafter. In an alternate embodiment (not shown), reflective facets 50 can be metalized if the light from reflective facets 44 strikes facets 50 at an angle less than the critical angle.

Referring to FIG. 2, aspheric lens 40 is provided to collimate the light exiting fiber optic cable 15. The axial distance between cable 15 and lens 40 is chosen such that the light diverging from cable 15 fills the aperture of lens 40. Lens 40 is preferably constructed to have a surface of revolution about axis 27 with a circular or hyperbolic cross section. As illustrated, element 40 is disposed on side surface 36 of reflector 16 and may be integral with reflector 16. In an alternate embodiment of reflector 16, lens 40 may comprise a separate lens disposed in operative proximity to reflector 16.

Referring to FIGS. 1 and 2, the NIR light pulses generated by light source 14 are received by reflector 16 from the second end of fiber optic cable 15. The light being emitted from the second end of cable 15 preferably has a spread angle between 20–50°. It should be understood, however, that the spread angle may be less than 20° or greater than 50° depending upon the light characteristics of cable 15. The emitted light enters reflector 16 through aspheric lens 40 disposed on the side surface 36 of reflector 16. As discussed previously, element 40 collimates the light, which then propagates toward reflective facets 44. Reflective facets 50 receive the light reflected from facets 44 and further reflect the light through the front surface 28 of reflector 16 generally in a first direction toward an object 26.

In an alternate embodiment of system 10, light reflector 16 could be replaced by a fan-shaped reflector described in commonly owned U.S. Pat. No. 6,422,713, which is incorporated by reference herein in its entirety. In this alternate embodiment, light source 14 could be directly coupled to the fan-shaped reflector. Thus, fiber optic cable 15 would not be needed.

Narrow-band optical filter 17 is provided to filter the NIR light reflected from object 26. Filter 17 allows a light at a wavelength equal to the wavelength of light generated by the light source 14 to pass therethrough. For example, when NIR light pulses are generated by light source 14, filter 17 allows only light within the NIR emission spectrum of the light source to pass therethrough and be received by light detector 19. In this case, filter 17 would prevent saturation of detector 19 by light emitted from other sources such as street lighting or head lamps (not shown) of other automotive vehicles. Filter 17 is conventional in the art and is preferably disposed proximate focusing lens 18.

Focusing lens 18 is provided to focus light pulses passing through filter 17 onto light detector 19. Lens 18 may comprise an aspherical lens, a doublet lens, or a triplet lens and could be constructed from optical glass or plastics such as that used for standard camera lenses.

Light detector 19 is provided to generate a signal ($V_S$) responsive to each light pulse received by detector 19. Detector 19 may comprise a photodiode having a 1.0 nanosecond (ns) response time. Signal ($V_R$) has an amplitude that is indicative of a power level of a received light pulse and is received by controller 20.

Controller 20 is provided to implement the methods for detecting an object in accordance with the present invention. Controller 20 includes a central processing unit (CPU) 21, input/output ports 22, read-only memory (ROM) 23 or any suitable electronic storage medium containing processor-executable instructions and calibration values, random-access memory (RAM) 24, and a data bus 25 of any suitable configuration. Controller 20 generates voltage pulses ($V_T$) for generating NIR light pulses and receives voltage signals ($V_R$) corresponding to the light pulses, as explained in greater detail below.

Figure 6:
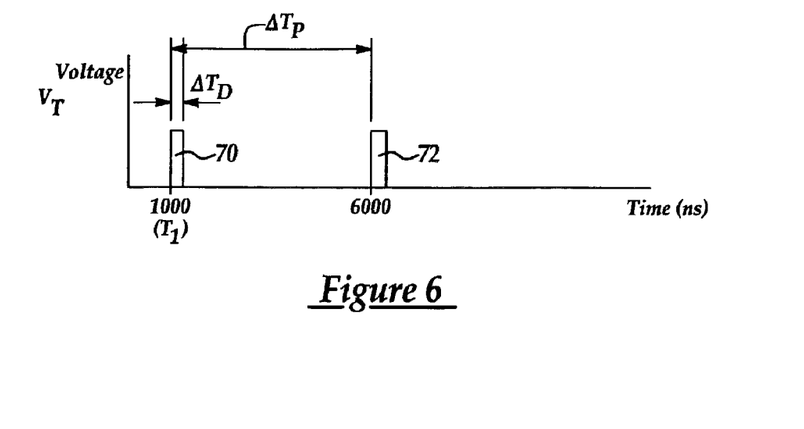
FIG. 6 is a schematic of control signals for inducing a diode laser to generate near infrared (NIR) light pulses.
Figure 13:
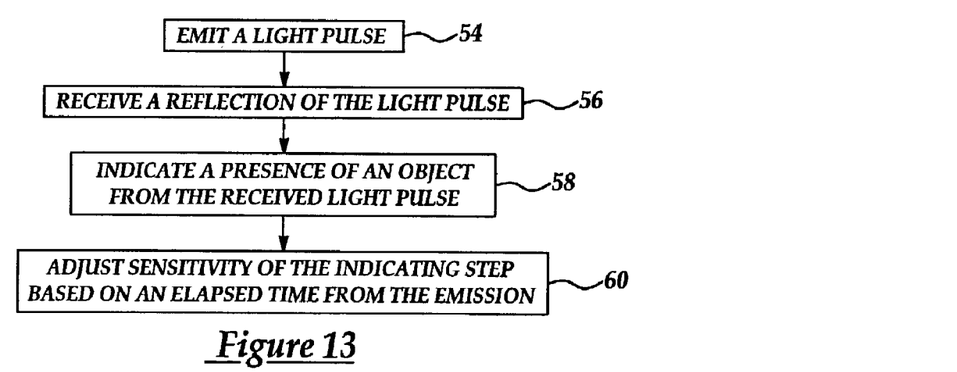
FIG. 13 is a flowchart of a method for detecting an object in accordance with a first aspect of the present invention.

Referring to FIGS. 6, 13, a method for determining a distance of an object in accordance with a first aspect of the present invention will now be described.

At step 54, light source 14 emits a light pulse. In particular, controller 20 can generate a voltage pulse 70 to induce light source 14 to generate a NIR light pulse that is transmitted to polymeric light reflector 16. The voltage pulse 70 can have a duration ($\Delta T_D$) of 10–40 ns, for example. Controller 20 can store the time ($T_1$) when the pulse was transmitted in RAM 24.

Reflector 16 may be configured to provide a horizontal light spread of 4–5 degrees and a vertical light spread of 1–2 degrees. As shown in FIG. 1, the light pulse can propagate from reflector 16 to an object 26 and be reflected from object 26.

Figure 7:
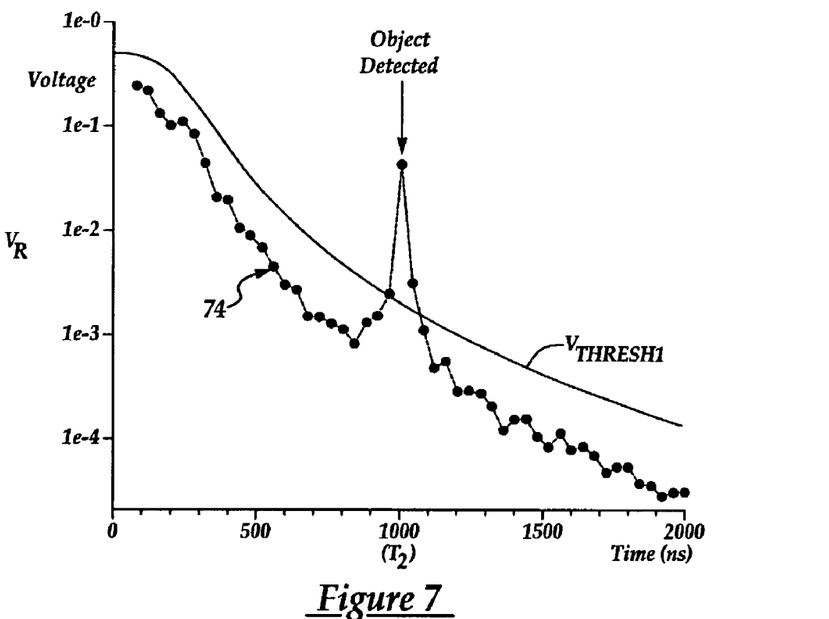
FIG. 7 is a schematic of a waveform generated from a NIR light pulse reflection and a threshold used to detect an object.

Next at step 56, the NIR light pulse reflected off object 26 can be received by light detector 19 that generates a voltage signal ($V_R$) based on the amplitude of light pulse. In particular, the amplitude of signal ($V_R$) is proportional to the amplitude of the light pulse. Referring to FIG. 7, the waveform 74 generated by voltage signals ($V_R$) over a monitoring period of 2000 ns (after transmission of NIR pulse 70) is illustrated.

Next at step 58, controller 20 can indicate a presence of an object 26 from the received light pulse. In particular, referring to FIG. 7, controller 20 can sample a voltage ($V_R$) generated by light detector 19 over time using I/O ports 22. For example, controller 20 can sample the voltage ($V_R$) every 40 ns over a monitoring time period of 2000 ns. Each of the sampled values of voltage ($V_R$) can be stored in RAM 24 of controller 20. The plurality of stored values of voltage ($V_R$) over the monitoring time period defines the received waveform 74—comprising a set of points illustrated in FIG. 7.

Once waveform 74 is obtained, one of two methods can be utilized to detect object 26 as recited in step 58. Referring to FIG. 7, a first method compares an amplitude of each point of waveform 74 to a threshold ($V_{THRESH1}$) to determine when an object 26 is detected. As shown, the threshold ($V_{THRESH1}$) is decreased over an elapsed time of 2000 ns. The threshold ($V_{THRESH1}$) is decreased because the transmitted and reflected light pulses decrease in signal strength by the square of the distance traveled, which leads to a return signal for relatively distant objects being proportional to $(1/Td^4)$, where $T_d$ (i.e., $T_d = T_2 - T_1$) is the total travel time of the light pulse. The predetermined threshold ($V_{THRESH1}$) may be defined using the following equation:

$$VTHRESH1 = \frac{1}{A + B*Td^2 + C*Td^4}$$

where $A$ = predetermined constant having units of $\frac{1}{\text{voltage}}$ $B$ = predetermined constant having units of $\frac{1}{\text{voltage} * \text{seconds}^2}$ $C$ = predetermined constant having units of $\frac{1}{\text{voltage} * \text{seconds}^4}$ The constants A, B, C may be empirically determined and depend on the sensitivity of detector 19, the field of view of detector 19, the transmission power of light source 14, and the shape, size, and reflective characteristics of the objects to be detected.

By decreasing the threshold ($V_{THRESH1}$) over a monitoring period, the sensitivity of system 10 is increased for detecting relatively distant objects that would have a reflection with a relatively small amplitude. Further, the sensitivity of system 10 to fog is decreased by having a relatively high threshold value for relatively small elapsed travel times (e.g., 0–500 ns) of the light pulse. It should be understood, that the threshold ($V_{THRESH1}$) could be implemented using equations different from the Equation (1). For example, ($V_{THRESH1}$) could be implemented using an equation that: (i) decreases ($V_{THRESH1}$) in a stepwise manner (with two or more steps) over time, or (ii) decreases ($V_{THRESH1}$) substantially linearly.

When waveform 74 has a voltage value greater than the threshold ($V_{THRESH1}$), controller 20 indicates object 26 is detected. In particular, controller 20 may generate a signal to energize an object detection light (not shown) or to cause a speaker (not shown) to emit a sound to notify a vehicle driver that an object has been detected.

Figure 8:
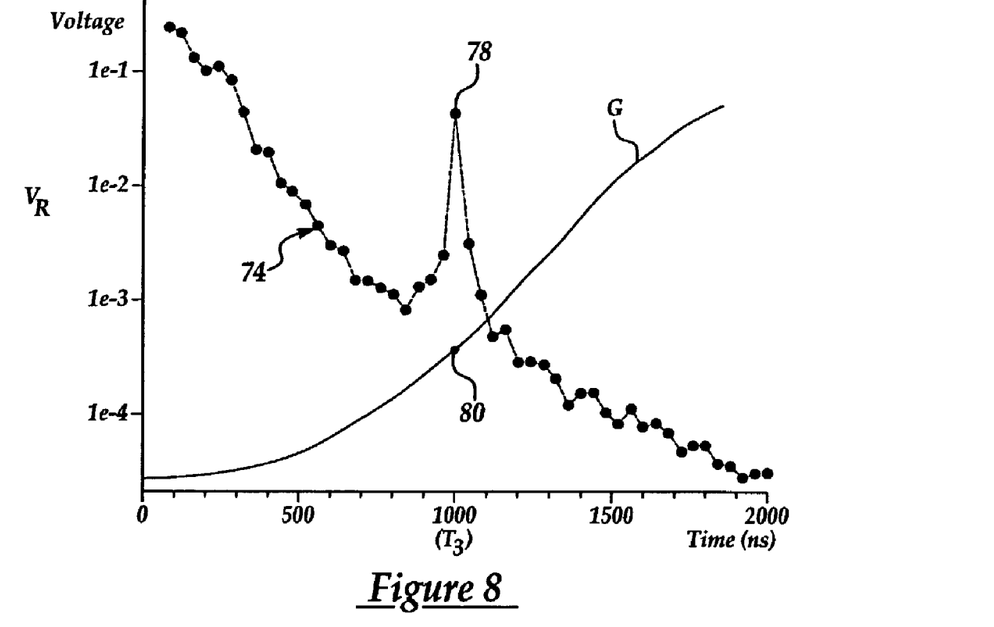
FIG. 8 is a schematic of a waveform generated from a NIR light pulse reflection and a signal gain.
Figure 9:
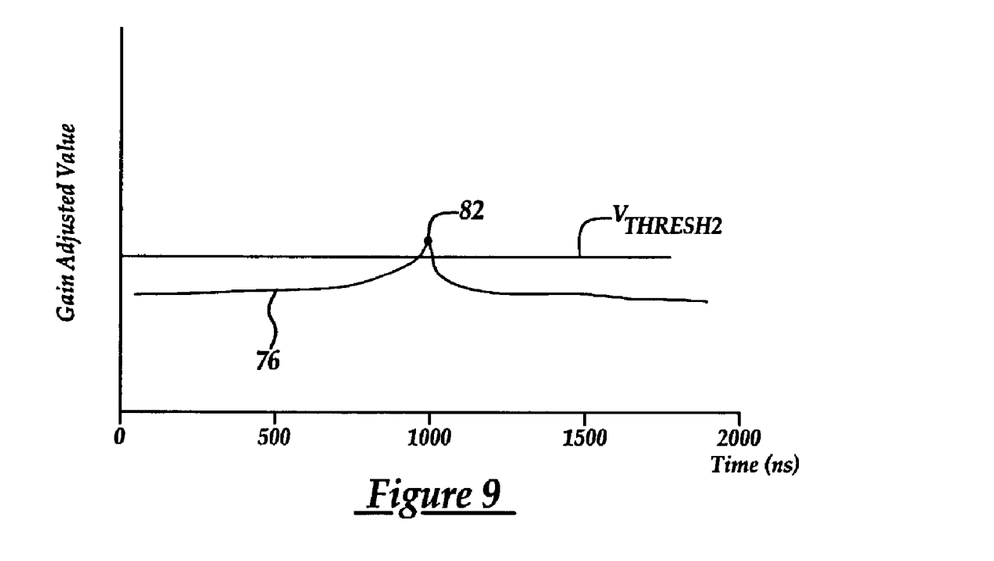
FIG. 9 is a schematic of a resultant signal generated from the waveform and gain of FIG. 8 and a threshold used to detect an object.

Referring to FIGS. 8, 9, a second method for detecting an object 26, as recited in step 58, is graphically illustrated. As shown, waveform 74 is obtained from portions of a received light pulse as described above. Further, a signal gain (G) is illustrated that increases over an elapsed time (or travel time) of a light pulse. Controller 20 can multiply the amplitude of each point of waveform 74 at a predetermined elapsed time by a corresponding signal gain value to obtain a gain-adjusted value. For example, the amplitude of waveform 74 at time T=1000 ns (value 78) can be multiplied by gain value 80 to obtain the gain-adjusted value 82. When the gain adjusted value is greater than a predetermined threshold ($V_{THRESH2}$), controller 20 indicates object 26 is detected. Thus, by increasing the gain (G) over the elapsed monitoring time, the sensitivity of system 10 is increased for detecting relatively distant objects that would have a return light pulse with a relatively small amplitude.

The gain (G) may be defined by the following equation:

$$G = D + E*T_d^2 + F*T_d^4$$

where:

D=predetermined dimensionless constant;
E=predetermined constant having units of (seconds)$^{-2}$;
F=predetermined constant having units of (seconds)$^{-4}$ The constants D, E, F in Equation (2) may be empirically determined and depend on the sensitivity of detector 19, the field of view of detector 19, the transmission power of light source 14, and the shape, size, and reflective characteristics of the objects to be detected. It should be understood that gain (G) could be defined by equations different from Equation (2). For example, (G) could defined by an equation that: (i) increases (G) in a stepwise manner (with two or more steps) over time, or (ii) increases (G) substantially linearly.

Referring again to FIG. 13, the step 60 adjusts sensitivity of indicating step 58 based on an elapsed time from the emission of the light pulse. As discussed above, the sensitivity of system 10 can be adjusted by adjusting either a threshold ($V_{THRESH1}$) or a gain (G) over the elapsed time period.

Figure 10:
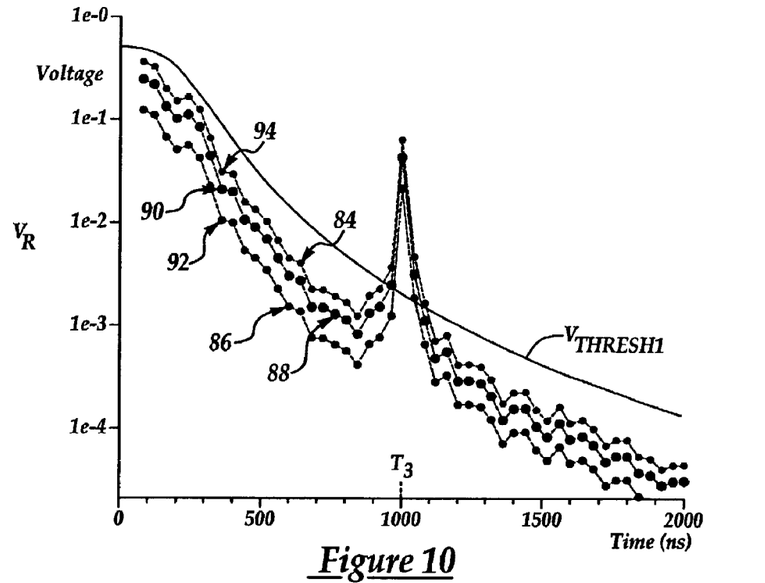
FIG. 10 is a schematic of an averaged waveform generated from two NIR light pulse reflections and a threshold used to detect an object.

Referring to FIG. 10, a method for detecting an object in accordance with a second aspect of the present invention will now be described.

At step 62, light source 14 emits a plurality of light pulses. Referring to FIG. 6, controller 20 can generate a plurality of voltage pulses ($V_T$), such as pulses 70, 72 or example, to induce light source 14 to generate NIR light pulses that are transmitted to light reflector 16. Although only two pulses 70, 72 are shown, controller 20 can generate as many pulses as needed to obtain a desired signal/noise ratio. The voltage pulses 70, 72 can each have duration of 10–40 ns with a repetition frequency of 100–500 Khz. The repetition frequency is defined as $1/\Delta T_P$, (where $\Delta T_P$ is the time duration between NIR light pulses) and determines the maximum detection range of system 10. For example, if the repetition frequency is 100 Khz, the system 10 would have a maximum detection range of 1500 meters (e.g., detection range=3.0E8/100,000/2) where 3.0E8 meters/second is the speed of light. Alternately, at a repetition frequency of 500 Khz, system 10 would have a maximum detection range of 300 meters.

As shown, the light pulses can propagate from reflector 16 to an object 26 and be reflected back from object 26.

Referring to FIG. 13, at step 64, the light pulses reflected off object 26 can be received by NIR light detector 19 which generates a plurality of voltage signals ($V_R$) based on the power level or intensity of light pulses. In particular, the amplitude of signals ($V_R$) are proportional to the amplitude of the light pulses.

Next at step 66, controller 20 can indicate a presence of an object 26 from the received light pulses. In particular, after generating pulse 70, controller 20 can sample a voltage ($V_R$) generated by light detector 19 over a first monitoring period to obtain waveform 84. Subsequently, after generating pulse 72, controller 20 can sample voltage ($V_R$) generated by light detector 19 over a second monitoring period to obtain waveform 86. Waveforms 84, 86 can be stored in RAM 24. Thereafter, controller 20 can align each waveform 84, 86 in a common time interval and calculate an average value of waveforms 84, 86 for each sample time on the common time interval. For example, data value 90 of waveform 88 may correspond to the average value of data values 92, 94 of waveforms 86, 84, respectively.

As discussed above, controller 12 could produce an averaged waveform from more than two waveforms. For example, controller 20 could generate 2000 light pulses having a repetition frequency of 200 Khz. Thereafter, controller 20 could calculate an averaged waveform every 10 milliseconds from 2000 received light pulses.

Once averaged waveform 88 is obtained, one of two methods can be utilized to detect object 26 as recited in step 66. Referring to FIG. 10, a first method compares waveform 88 to threshold ($V_{THRESH1}$) The characteristics of threshold ($V_{THRESH1}$) were discussed above. When the averaged waveform 88 has a voltage value greater than the threshold ($V_{THRESH1}$) controller 20 indicates object 26 is detected.

Figure 11:
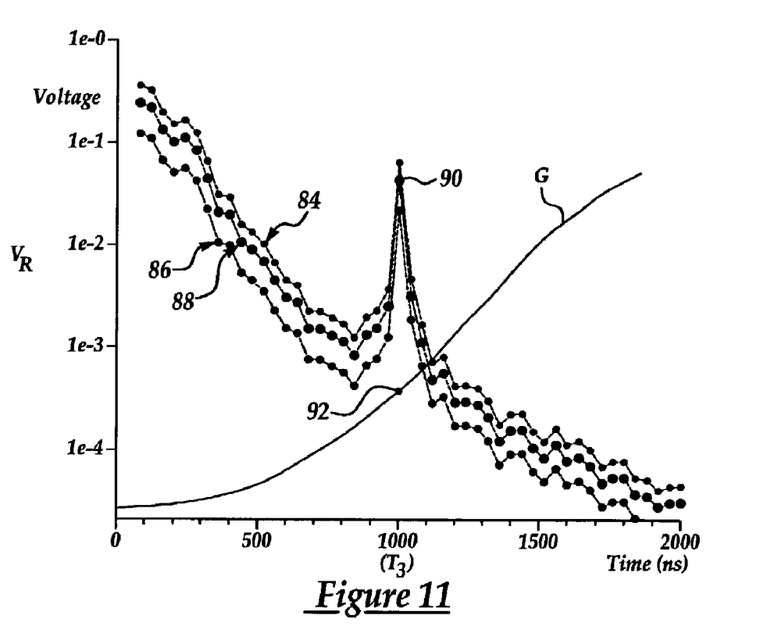
FIG. 11 is a schematic of a waveform generated from two NIR light pulse reflections and a signal gain.
Figure 12:
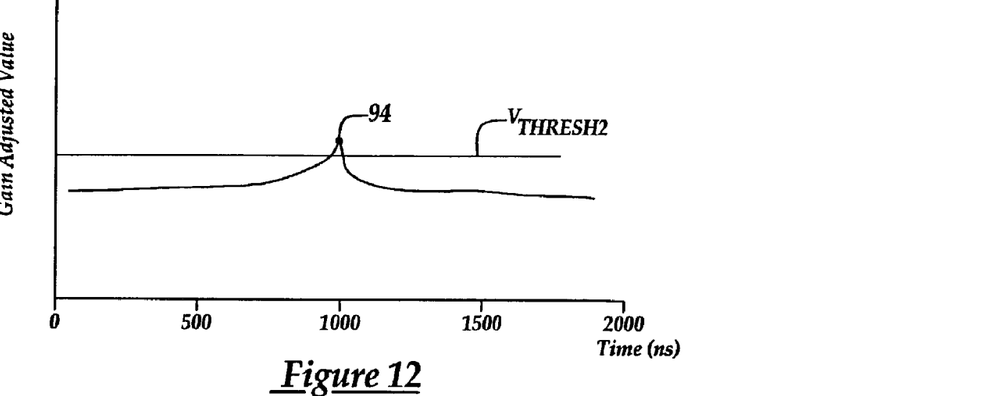
FIG. 12 is a schematic of a resultant signal generated from the waveform and gain of FIG. 11 and a threshold used to detect the object.

Referring to FIGS. 11 and 12, a second method for detecting an object 26, as recited in step 66, is graphically illustrated. Controller 20 can multiply the amplitude of each point of waveform 88 at a predetermined elapsed time by a corresponding signal gain value to obtain a gain-adjusted value. For example, the amplitude of waveform 88 at time T=1000 ns (value 90) is multiplied by gain value 92 to obtain the gain-adjusted value 94. When the gain adjusted value is greater than a predetermined threshold ($V_{THRESH2}$), controller 20 indicates object 26 is detected. Thus, by increasing the gain (G) over elapsed time, the sensitivity of system 10 is increased for detecting relatively distant objects that have a reflected light pulse with a relatively small amplitude.

Figure 14:
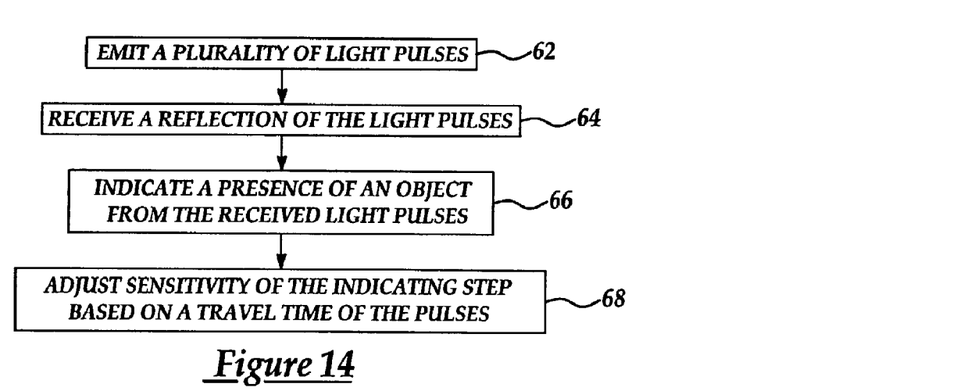
FIG. 14 is a flowchart of a second method for detecting an object in accordance with a second aspect of the present invention.

Referring again to FIG. 14, the step 68 adjusts sensitivity of indicating step 66 based on a travel time of the pulses. As discussed above, the sensitivity of system 10 can be adjusted by adjusting either a threshold ($V_{THRESH1}$) or a gain (G) over a common time interval.

The system 10 and the methods for detecting objects according to the present invention represent a significant improvement over conventional systems and methods. In particular, system 10 varies its detection sensitivity based on elapsed travel time of the light pulse to detect objects at relatively large distances. Further, by varying the detection sensitivity, system 10 can detect objects through fog.

We claim:

1. A method for detecting an object, comprising:
   emitting a light pulse;
   receiving a reflection of said light pulse;
   indicating a presence of the object from said received light pulse; and,
   adjusting sensitivity of said indicating step based on an elapsed time from said emission.

2. The method of claim 1 wherein said adjusting step comprises increasing said sensitivity as said elapsed time from said emission increases.

3. The method of claim 1 wherein sensitivity has a first sensitivity value at a first elapsed time and a second sensitivity value at a second elapsed time after said first elapsed time, said second sensitivity being greater than said first sensitivity.

4. The method of claim 1 wherein said emitting step includes:
   transmitting said light pulse to a polymeric light reflector; and,
   reflecting said light pulse outwardly from said light reflector.

5. The method of claim 1 wherein the step of adjusting sensitivity comprises:
   adjusting a signal from the received light pulse using a signal gain that increases with elapsed time from emission.

6. The method of claim 1 wherein the step of adjusting sensitivity comprises:
   decreasing a detection threshold in a stepwise manner based on the elapsed time from the emission.

7. The method of claim 1 further comprising:
   storing values corresponding to a first plurality of received light pulses during a first monitoring period;
   storing values corresponding to a second plurality of received light pulses during a second monitoring period;
   aligning stored values from the first and second monitoring periods;
   averaging the aligned values to produce an average waveform; and
   comparing the average waveform to a threshold to indicate presence of the object.

8. The method of claim 7 wherein the average waveform is compared to a threshold that decreases based on elapsed time from said emission.

9. The method of claim 7 wherein the average waveform is adjusted by a gain that increases based on elapsed time from said emission.

10. A method for detecting an object, comprising:
    emitting a plurality of light pulses;
    receiving a reflection of said light pulses;
    indicating a presence of the object from said received light pulses; and,
    adjusting sensitivity of said indicating step based on a travel time of said pulses.

11. The method of claim 10 wherein the step of adjusting sensitivity comprises:
    applying a signal gain that increases with elapsed travel time to the signal from the received light pulse.

12. A system for detecting an object, comprising:
    a light source generating a light pulse, said light pulse being emitted;
    a light detector configured to receive a reflection of said pulse; and,
    a controller operably connected to said light source and said detector, said controller configured to indicate a presence of the object from said received light pulse, said controller further configured to adjust sensitivity for detecting the object based on an elapsed time from said emission.

13. The system of claim 12 wherein said light source comprises a near infrared diode laser.

14. The system of claim 12 wherein said light detector comprises a near infrared light detector.

15. The system of claim 12 wherein said sensitivity is adjusted to have a first sensitivity value at a first elapsed time and a second sensitivity value at a second elapsed time alter said first elapsed time, said second sensitivity being greater than said first sensitivity.

16. An article of manufacture, comprising:
    a computer storage medium having a computer program encoded therein for detecting an object, said computer storage medium comprising:
    code for inducing a light transmitter to emit a light pulse;
    code for storing values indicative of a reflection of said light pulse;
    code for indicating a presence of the object from said stored values; and,
    code for adjusting sensitivity for detecting the object based on elapsed time from said emission.

17. A method for detecting an object, the method comprising:
    emitting a light pulse;
    receiving a reflection of the light pulse; and
    indicating presence of the object when a power level of the received light pulse exceeds a signal threshold that decreases based on elapsed time from the emission.

18. A method for detecting an object, the method comprising:
    emitting a light pulse;
    receiving a reflection of the light pulse;
    indicating presence of the object when a power level of the received light pulse multiplied by a signal gain that increases with elapsed time from emission is greater than a detection threshold.

* * * * *